March 17, 1959  H. R. BROWN, JR  2,878,434
ERROR SENSING SERVO COMPONENT
Filed May 10, 1954  2 Sheets-Sheet 1

*INVENTOR.*
HENRY R. BROWN, JR.
BY William R. Lane
ATTORNEY

*INVENTOR.*
HENRY R. BROWN, JR.
BY William R. Lane

ATTORNEY

United States Patent Office 2,878,434
Patented Mar. 17, 1959

2,878,434

ERROR SENSING SERVO COMPONENT

Henry R. Brown, Jr., Whittier, Calif., assignor to North American Aviation, Inc.

Application May 10, 1954, Serial No. 428,749

11 Claims. (Cl. 318—28)

This invention relates to servo components and particularly to a component which is subjected to a plurality of "on-off" inputs of varying significance and which produces an output which is a function of the most significant input.

It is frequently desired, particularly in the field of servos, to produce an output which is a predetermined function of the most significant of a plurality of inputs. For example, referring to U. S. Patent 2,537,427 issued January 9, 1951 in the names of E. Seid et al. for "Digital Servo" there is shown a reversible binary counter consisting of a plurality of bistable multivibrators. A closed servo loop is provided to effectively reduce the number stored in this counter to zero while simultaneously producing a rotational shaft output proportional to the stored number. This closed loop servo system comprises a pulse generator connected to feed pulses into the binary counter at a rate and with an effective polarity determined by the speed and direction of rotation of a motor, and a summing network for converting the number stored on the counter to a potential which is used to drive the motor. It is a purpose of this invention to provide a servo component which may be substituted for the aforementioned summing network. The component contemplated by this invention is not to be limited to the specific digital servo of the aforementioned patent, however, but may be used wherever an output is desired which is a function of the most significant of a plurality of inputs having different weight factors.

It is therefore an object of this invention to provide an apparatus for producing an output which is a function of the most significant input of a plurality of inputs having varying weights.

It is another object of this invention to provide a servo component capable of delivering an output which is a function of the largest actuated stage of a binary counter.

It is a further object of this invention to provide a servo component for a digital servo to produce an output which is a predetermined function of the number stored in a counter and which is independent of the relative plate supply fluctuations and drift of the stages of the counter.

It is another object of this invention to provide a servo component capable of producing a shaft rotation proportional to the number stored in a binary counter.

It is a further object of this invention to provide a digital servo component which has a directional sense as well as a selectivity sense.

Other objects of invention will become apparent from the following description taken in connection with the accompanying drawings, in which Fig. 1 is a block diagram of a digital servo system utilizing the error sensing servo component contemplated by this invention;

Figure 2:
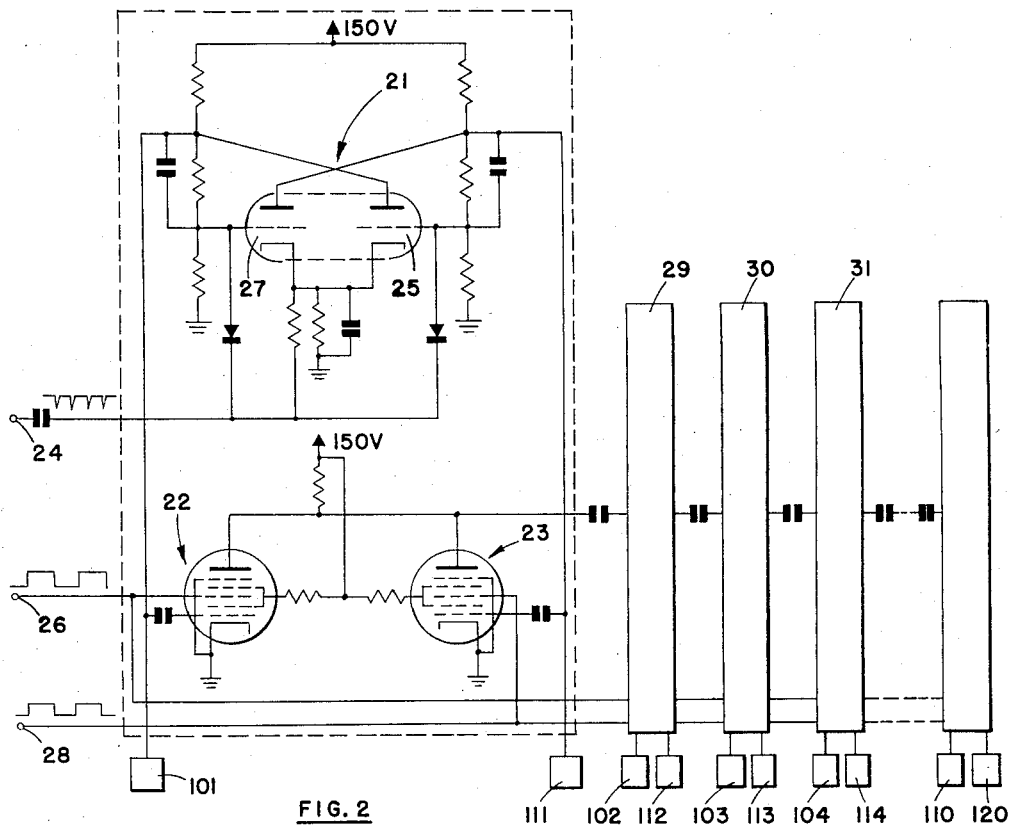
Fig. 2 is a diagram, partly schematic, of the reversible binary counter of Fig. 1.
Figure 1:
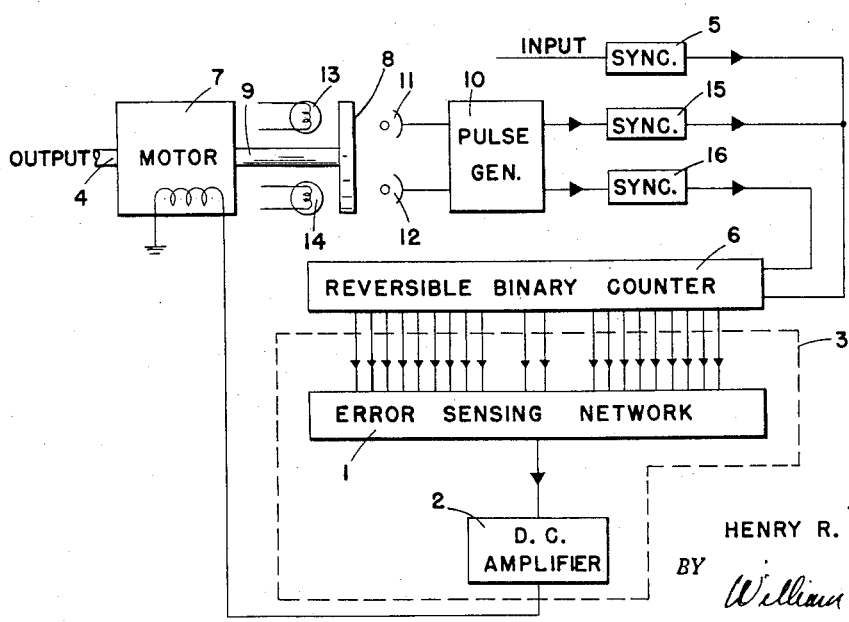

Referring now to Fig. 1, a block diagram of a digital servo similar to that shown in Fig. 2 of Patent No. 2,537,-427 is shown. However, in place of the ± summing networks, ± modulators, and ± gates shown in Fig. 2 of the patent the circuit of Fig. 1 utilizes error sensing network 1 of this invention and D.-C. amplifier 2. For clarity, the new components are enclosed in dotted lines 3. It is desired to produce an angular rotation of shaft 4 proportional to a number stored in reversible binary counter 6. This number is placed in counter 6 by a series of random input pulses from a source (not shown) through synchronizer 5. A closed loop servo system is used to reduce the number stored in counter 6 to zero.

In the past, the servo system produced a voltage, by means of a summing network, proportional to the number stored in the counter, and utilized this voltage to drive motor 7. The rotation of perforated disc 8 attached to shaft 9 of motor 7 actuated pulse generator 10. By offsetting two holes in disc 8 it was possible to determine not only the number of revolutions of shafts 4 and 9 but also to sense the direction of rotation. Photocells 11 and 12 and light sources 13 and 14 were used for this purpose. Thus if disc 8 has rotated in one direction, photocell 11 changed from light to dark while photocell 12 was illuminated and if the direction of rotation of disc 8 was reversed photocell 11 changed from dark to light while photocell 12 was illuminated. Pulse generator 10 sensed the polarity of the input and coupled a pulse through the add synchronizer 15 or the subtract synchronizer 16 to counter 6 in a manner to reduce the number stored in the counter. Synchronizers 5, 15 and 16 are provided to prevent the simultaneous subjection of counter 6 by pulses from pulse generator 10 and the random input. It is to be noted that the summing network was sensitive to source voltage fluctuations, drift of the electronic tubes, and variations in resistivity of the summing resistors. Thus a very slight deviation in a high order digits stage of counter 6 produced an error signal equivalent to the actuation of several small order digit stages. For example, referring once again to U. S. Patent No. 2,537,427, assume stage 59 of Fig. 7 is not actuated. A very small deviation in the voltage applied to resistor 75 has more effect on the output voltage across resistor 51 than actuation of stage 52. If, however, the error sensing network contemplated by this invention is substituted for the summing network, this source of error is eliminated.

Referring now to Fig. 2, a schematic drawing of a single stage of reversible binary counter 6 is shown with the other similarly constructed stages shown as blocks. This stage utilizes bistable multivibrator 21, add gate 22, and subtract gate 23. Each succeeding stage of counter 6 is similarly constructed. There is a short negative pulse input at terminal 24 whenever a pulse is coupled through synchronizers 5, 15, or 16. If the pulse is coupled through synchronizers 5 or 15, a positive gating pulse simultaneously appears at terminal 26. If the pulse is coupled through synchronizer 16, a positive gating pulse appears at terminal 28. Negative pulses impressed at terminal 24 cause multivibrator 21 to change its state. Each time tube 25 of multivibrator 21 ceases conducting while a positive add gating pulse is appearing at terminal 26, add gate 22 is actuating causing a pulse input to the next succeeding stage. Similarly, each time tube 27 ceases conducting while a positive subtracting gating pulse appears at terminal 28, subtract gate 23 is actuated passing on a pulse to the next succeeding stage. Assuming the number zero is indicated by counter 6 whenever all of the left triodes of the multivibrators are simultaneously conducting, the first add pulse at terminal 24 causes the right tube of the multivibrator in stage one to start conducting. The second add pulse causes the right tube of second stage 29 to start conducting, the fourth add pulse causes the right tube of third stage 30 to conduct, the eighth pulse causes the right tube of fourth stage 31 to conduct, etc. Switch 111 is designed to be sensitive to the conduction of right tube 25, that is, switch 111 closes a circuit (to be described later) whenever the potential on the plate of tube 27 is at a maximum. Similarly, switch 101 is sensitive to the conduction of left tube 27. Switches 102—110 to 112—120 are provided for each tube in the subsequent stages of counter 6. It is readily apparent that the outputs of the various stages of counter 6 have significantly different weight factors in detemining the magnitude of the stored number. Thus, actuation of the third stage only occurs once every four pulses and is equivalent to the number four in the counter whereas the first stage is actuated by every pulse and only represents the number 1.

Figure 3:
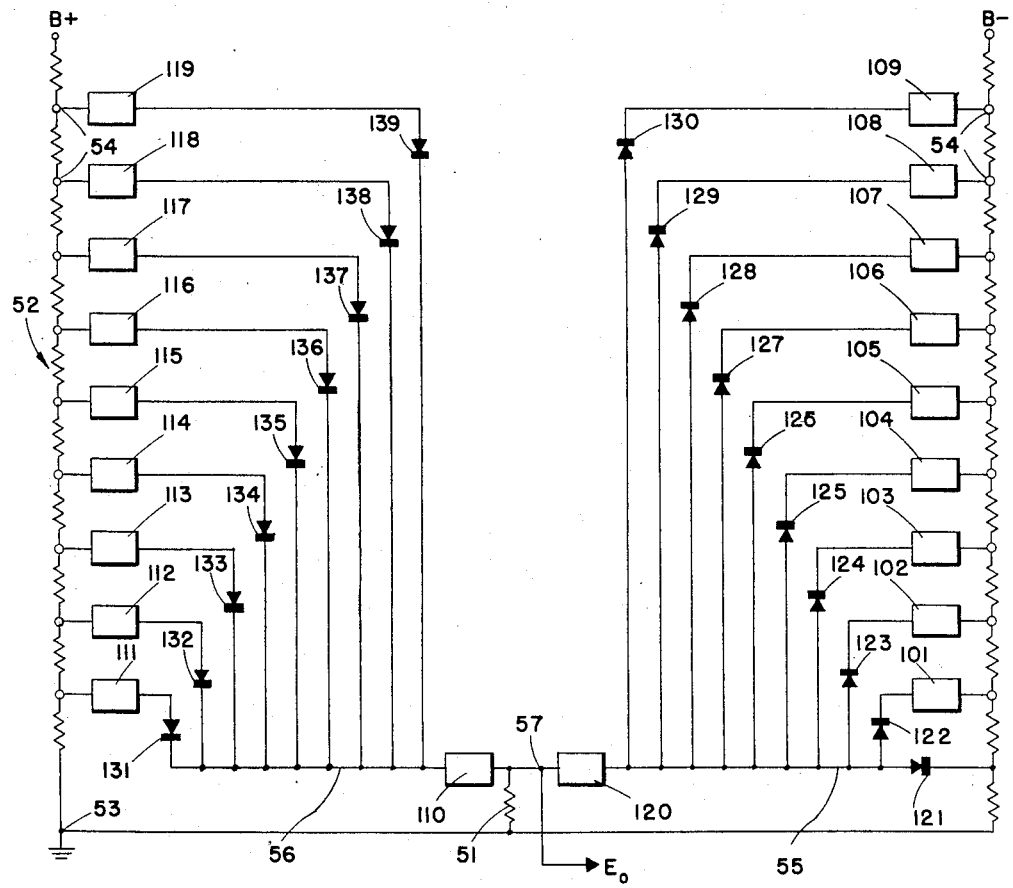
Fig. 3 is a schematic drawing of a preferred embodiment of the error sensing network contemplated by this invention.

Referring now to Fig. 3 a schematic drawing of a circuit for producing an output which is a function of the most significant actuated stage of counter 6 is shown. It is desired to produce across load resistor 51 an output voltage, $E_0$, whose magnitude is a function of the most significant actuated stage in counter 6 and whose polarity indicates whether the number stored in counter 6 is positive or negative. As previously pointed out when the number zero is stored in counter 6, the left triodes of the multivibrators in each stage of counter 6 are conducting. Under these conditions switches 101—110 are closed while switches 111—120 are open. Bleeder resistor 52 is connected across a source (not shown) of positive and negative potential. Tap 53 on bleeder resistor 52 is grounded. Numerous taps 54 are provided on resistor 52 for connecting through switches 101—109 and 111—119 to bus bars 55 and 56, respectively. Bus bars 55 and 56 are connected through switches 120 and 110, respectively, to common output terminal 57. Unidirectional devices 121—139, such as crystal or gas-filled diodes, are connected in series with switches 101—109 and 111—119 in the manner shown. It is the purpose of these unidirectional devices to prevent a lower stage of counter 6 from affecting the output voltage as long as a higher stage is actuated.

The operation of the error sensing device of Fig. 3 can best be explained by utilizing examples. For purposes of illustration, assume the positive number 51 is stored in counter 6. Under this condition the right triodes of the multivibrators in the first, second, fifth and sixth stages are conducting. Therefore, switches 111, 112, 115 and 116 are closed. As explained in U. S. Patent No. 2,537,427 previously referred to (see column 7, line 15, and following) the last multivibrator stage which is associated with switches 110 and 120 is used to select either the positive or negative summing circuit depending on the sign of the stored number. Switch 110 is always closed and 120 is open with positive number storage and vice versa with negative number storage. To accomplish this, it is necessary that the counter have at least twice the storage capacity of the maximum number to be stored. This last stage will only change state when going from positive to negative number storage in the counter or vice versa. Therefore, switch 110 is always closed when a positive number is stored in counter 6, there is a current path from ground through load resistor 51 to bus bar 56. Since switch 116 connects bus bar 56 to a higher potential on bleeder resistor 52 than is applied through switches 111, 112, or 115, the former connection predominates over the latter connections. Thus neglecting the small voltage drops across switch 116 and diode 136, bus bar 56 is subjected to the potential at the connection of switch 116 to bleeder resistor 52. It is to be noted that the resistance between taps on bleeder resistor 52 is preferably at least large enough to cause a voltage drop greater than the combined voltage drop across switch 116 and diode 136. Under these conditions the closing of any one stage always results in the bus bar acquiring a potential greater than the tap of the next lower stage. Thus, as long as switch 116 is closed, bus bar 56 is maintained at a higher potential than the potential of the bleeder resistor connected to switch 115. Diode 135 prevents the flow of current from resistor 52 through switch 115 to bus bar 56. Similarly, diodes 131 and 132 prevent the flow of current through switches 111 and 112, respectively, to bus bar 56. As long as switch 116 is closed the output voltage, $E_0$, remains constant despite any opening or closing of switches 111—115. Thus switch 116, being responsive to the most significant of a plurality of inputs with progressively different weight factors, determines the output. Other positive numbers stored on counter 6 operate in a similar manner, with the highest actuated stage always determining the magnitude of the output voltage.

As a further illustration of the operation of the error sensing device of Fig. 3, assume that the number zero is stored on counter 6, i. e., all of the left triodes of the multivibrators are conducting. A subtract pulse couple into counter 6 should cause the counter to read −1. The subtract pulse effectively trips all ten of the multivibrators. Thus switches 111 through 120 are now closed while switches 101 through 110 are opened. Immediately, a small negative voltage is applied to output terminal 57 through unidirectional device 121 and switch 120. This output voltage signifies that the number −1 is stored on the counter. The servo system normally operates to return the counter to read zero. Larger negative numbers result in a larger negative output voltage. The operation of the system is very similar to that previously described with respect to positive numbers. Thus, the number −51 stored on counter 6 results in the conduction of the left triodes of the multivibrators in the second, fifth and sixth stages. Since a number indicated by the sixth stage has twice the significance of a number stored in the fifth stage, the closing of switches 102, 105 and 106 results in a voltage being impressed across load resistor 51 which is substantially equivalent to the voltage tapped from bleeder resistor 52 by switch 106. Diodes 121, 123, and 126 prevent the lower stages from affecting this output voltage.

Figure 4:
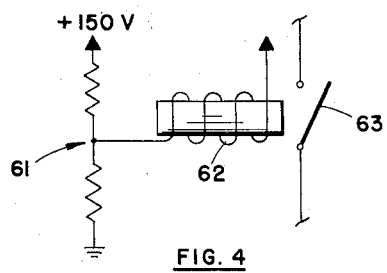
Fig. 4 is a schematic drawing of a means for coupling the binary counter of Fig. 2 to the error sensing network of Fig. 3.

Referring now to Fig. 4 a schematic drawing of a relay switch is shown. As previously pointed out, the output voltage obtained from the plate of the multivibrator triodes varies between two values depending on whether the tube is conducting or not conducting. As an example, these values may be 75 v. and 100 v., respectively. In Fig. 4, a bleeder network 61 maintains one terminal of relay coil 62 at 75 v. The other terminal of coil 62 is connected to the plate of a multivibrator triode. As long as the triode conducts, no voltage appears across coil 62 and contact 63 remains open. As soon as the triode ceases to conduct, 25 volts is impressed across coil 62, closing contact 63.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In combination, an electronic counter adapted to convert input pulses into a stored number signified by the actuation of a plurality of bistable multivibrator stages of progressively greater numerical significance, and means for producing a signal output which is at all times a function of the significance solely of the most significant actuated multivibrator stage of said counter.

2. In combination, an electronic counter adapted to convert a pulse input into a stored number signified by the actuation of bi-stable multivibrator stages of varying numerical significance; means for producing a signal output which is proportional solely to the significance of the most significant actuated stage of said counter; and means responsive to the output of said signal producing means for reducing the number stored in said counter whereby the number stored in said counter is reduced to zero.

3. In combination, an electronic counter adapted to convert a pulse input into a stored number signified by the selective actuation of a plurality of bistable multivibrator stages of diverse numerical significance; a plurality of sources of diverse D.-C. potentials; an output terminal; means individually responsive to the actuation of said multivibrator stages for connecting said output terminal to a corresponding potential source with the more significant multivibrator stage controlling the connection to a source of higher potential; and means for negating at all times the connection of a low potential source to said output terminal whenever a higher potential source is also connected to said output terminal whereby said output terminal is subjected to a potential the magnitude of which is determined solely by the most significant actuated stage of said counter.

4. A combination as recited in claim 3 in which said connection negating means comprises rectifiers connected between said sources and said terminal in a manner to signify an open circuit if said terminal has a higher potential than the corresponding source.

5. A servo component for producing an output which is a function solely of the most significant of a plurality of input signals of diverse importance comprising a source of D.-C. potential having a plurality of taps at diverse D.-C. potentials, the relative ratios of the D.-C. potentials on said taps being substantially equivalent to the relative ratios of significance of said plurality of input signals; an output terminal, means responsive to each of said input signals for individually connecting said output terminal to a corresponding tap on said D.-C. potential source with the signals of greater importance effecting the connection to a tap of greater potential; and means for at all times effectively disconnecting the connections to lower potential taps whenever a higher potential tap is connected to said output terminal whereby said output terminal is subjected to a potential which is a measure solely of the most significant input signal.

6. A servo component as recited in claim 5 in which said connection disconnecting means comprises a plurality of non-linear elements connected between each of said taps and said output terminal in a manner to signify an open circuit whenever said output terminal is subjected to a higher potential than the corresponding tap.

7. A servo component for producing an output as a function of the most significant of a plurality of input signals having varying weights comprising a source of potential; a bleeder impedance having a plurality of taps connected across said source of potential; a common output terminal; and a plurality of connecting means individually connecting said taps to said common terminal, each of said connecting means including a connect-disconnect element and a non-linear element connected in series between said common terminal and a tap of said impedance, each of said connect-disconnect elements being individually controlled by each of said plurality of input signals with the more significant of said input signals controlling the connect-disconnect element in the connecting means to the higher potential taps and said non-linear elements being connected to block current flow through said connecting means at all times when said terminal has a higher potential than the corresponding tap whereby the voltage appearing at said output terminal is a measure of the most significant input signal.

8. A servo component useful for producing an output as a measure of the most significant input signal of a plurality of on-off input signals having diverse importance comprising a source of D.-C. potential, a bleeder resistor having a plurality of taps connected across said D.-C. potential source; an output terminal; connectors including a connect-disconnect means and a rectifier connected in series between each of said taps and said output terminal, said rectifiers being connected with a polarity to show substantially an open circuit in all instances when said output terminal is subjected to a greater potential than that on the corresponding tap on said bleeder resistor; and means for actuating said connect-disconnect means individually in response to a corresponding on-off input signal with the more significant on-off input signals actuating the connect-disconnect means in the connectors to the taps of greater potential and with said connect-disconnect means being connected in a manner to produce a connected condition whenever the corresponding input signal is in an on condition and a disconnected condition whenever said input signal is in an off condition whereby said output terminal is subjected to a potential the magnitude of which is determined solely by the most significant input signal.

9. The combination recited in claim 2 in which said means for producing a signal output which is proportional solely to the significance of the most significant actuated stage of said counter comprises first and second output terminals, a source of direct current, said first output terminal being connected to one side of said source, a voltage divider having a plurality of taps connected across said source, a plurality of switches each controlled by one of said bistable multivibrator stages, each of said switches being individually connected to one of said taps, and a plurality of unidirectional current valves each of said valves connected between one of said switches and said second output terminal.

10. In combination, a binary counter having a plurality of output stages, means for actuating said stages, each of said stages when actuated having an output of predetermined significance, a servo component, individual switch means each responsive to a separate one of said output stages for separately connecting a signal output proportional to the significance of each of said actuated stages to and keeping signals associated with said non-actuated stages disconnected from said servo component, said servo component adapted to produce an output signal proportional solely to the significance of said actuated stage of greatest significance, and means responsive to said servo component output for controlling mechanical motion and reducing said output of said binary counter to zero.

11. In combination, a binary counter comprising a plurality of multivibrators indicative of individual differently weighted binary outputs, a servo component comprising a direct current power source, a voltage divider having a plurality of taps connected across said power source, a plurality of switches, each of said switches actuated by one of said multivibrators, a plurality of unidirectional current valves, a pair of output terminals, one of said output terminals being connected to one side of said power source, each of said valves being connected between one side of one of said switches and said other output terminal, the other ends of said switches each being connected to a separate one of said voltage divider taps whereby only a signal proportional solely to the weight of the multivibrator output of most significance will appear at said output terminals at any time.

References Cited in the file of this patent
UNITED STATES PATENTS

| | | |
|---|---|---|
| 2,537,427 | Seid et al. | Jan. 9, 1951 |
| 2,539,623 | Heising | Jan. 30, 1951 |
| 2,543,050 | Oberman | Feb. 27, 1951 |
| 2,556,200 | Lesti | June 12, 1951 |
| 2,610,295 | Carbrey | Sept. 9, 1952 |
| 2,612,550 | Jacobi | Sept. 30, 1952 |
| 2,658,139 | Abate | Nov. 3, 1953 |
| 2,685,084 | Lippel | July 27, 1954 |
| 2,686,632 | Wilkinson | Aug. 17, 1954 |
| 2,731,631 | Spaulding | Jan. 17, 1956 |